United States Patent [19]

Orban

[11] 4,168,898
[45] Sep. 25, 1979

[54] DISPLAY SYSTEM FOR CAMERA

[75] Inventor: Jean M. Orban, Santa Monica, Calif.

[73] Assignee: Vivitar Corporation, Santa Monica, Calif.

[21] Appl. No.: 784,929

[22] Filed: Apr. 5, 1977

Related U.S. Application Data

[63] Continuation-in-part of Ser. No. 597,479, Jul. 21, 1975.

[51] Int. Cl.$^2$ .............................................. G03B 17/00
[52] U.S. Cl. ...................................... 354/289; 354/39; 354/53; 354/61
[58] Field of Search ................... 354/23 R, 53, 54, 55, 354/56, 57, 61, 39, 273, 289

[56] References Cited

U.S. PATENT DOCUMENTS

| | | | |
|---|---|---|---|
| 3,232,193 | 2/1966 | Stimson | 354/60 E |
| 3,448,673 | 6/1969 | Singer et al. | 354/273 |
| 3,611,893 | 10/1971 | Starp | 354/60 E |
| 4,037,235 | 7/1977 | Veda | 354/60 E |

FOREIGN PATENT DOCUMENTS

1132430 6/1962 Fed. Rep. of Germany ............. 354/53

*Primary Examiner*—Russell E. Adams
*Attorney, Agent, or Firm*—Lyon & Lyon

[57] ABSTRACT

There is disclosed herein an electronic system and display system for a camera. The electronic system receives various inputs pertaining to film speed, brightness, selected shutter speed and a relative aperture value, and provides outputs for control of shutter speed and aperture as well as display of these parameters. An electrical signal representing a relative aperture value is provided for the display system, and a mechanical input is provided to the display system representing a fixed aperture value, such as minimum aperture value or $A_o$. The electrical and mechanical inputs are combined to provide a display of an absolute aperture value, such as computed aperture value $A_c$. Details of the camera electronic system also are disclosed.

9 Claims, 5 Drawing Figures

4,168,898

DISPLAY SYSTEM FOR CAMERA

CROSS REFERENCE TO RELATED APPLICATION

This application is a continuation-in-part of application Ser. No. 597,479 filed July 21, 1975 in the name of the present inventor and assigned to the assignee of the present application, the disclosure of which is incorporated herein by reference.

BACKGROUND OF THE INVENTION

The present invention relates to cameras, and more particularly to a new form of display system therefor.

While not intending to be limited thereby, the background of the present invention and the concepts of the present invention will be described in the environment of a single lens reflex (SLR) camera. Such cameras typically include an objective lens, or interchangable objective lenses, and a camera body to which the lens is attached. The camera body houses the film, shutter, associated viewing optics and display, and a light sensor and electronic control circuit for controlling either the speed of the shutter or the opening of the aperture diaphragm or both. The diaphragm (iris) usually is contained within the objective lens assembly.

Cameras of this nature have included various forms of displays. Typical examples include a meter with a pointer used in the "match needle" type systems, illuminated indicia to indicate taking parameters, and the like. The above-referenced application discloses, inter alia, a new form of electronic system for cameras and new forms of display systems therefor.

The present invention provides a simplified form of display system for a camera. The usual objective lens has a given f-stop range of eight to nine f-stops, and the open aperture value ($A_o$, such as f 1.4, f 2, etc.) varies from lens to lens. The light sensing system measures light passing through the objective lens being used and the resulting electrical signal is a function of brightness (B) and the open aperture value ($A_o$) of the lens in use. Instead of entering a separate electrical signal for $A_o$, the calculations of aperture value are performed with a "relative" aperture value since ratios are involved in the calculations. However, an absolute aperture value is needed for display to the camera user, and this value is derived by performing a combined electrical and mechanical summation. More particularly, an electrical signal representing a relative aperture value (such as $A_c-A_o$) and a fixed aperture parameter (such as $A_o$) are mechanically added to thereby derive an absolute aperture value (eg., $A_c$) for display to the camera user. This is accomplished in an exemplary embodiment by physically moving an aperture scale as a function of the fixed aperture value while electrically providing the relative aperture value through an electrical meter, series of light sources, or the like. This system enables simplification of the aperture potentiometer system, the camera electronics and display, and provides an automatic reduction of the f-stop range to be used in the calculations and display.

Accordingly, a principal object of the present invention is to provide an improved display system for photographic devices.

Another object of the present invention is to provide an improved form of camera system wherein electrical computations are performed using a relative aperture value signal, and an absolute aperture value is derived for display by performing a combined electrical and mechanical summation.

BRIEF DESCRIPTION OF THE DRAWINGS

The further features and advantages of the present invention will become more apparent through a consideration of the following description of a preferred embodiment, taken in conjunction with the drawings in which.

DETAILED DESCRIPTION

Figure 1A:
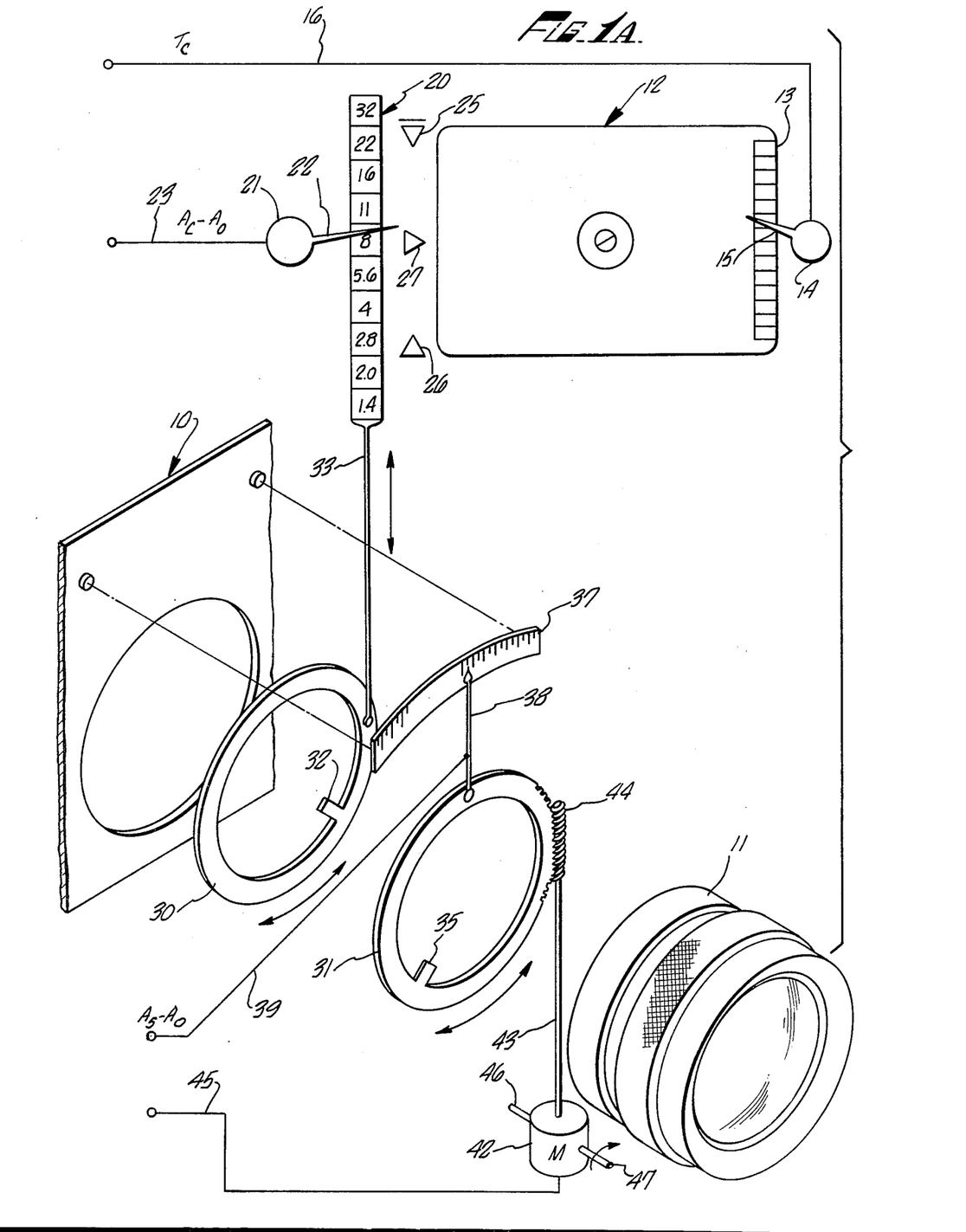
FIGS. 1A and 1B are simplified diagrams of the present display and electronic system according to the present invention.
Figure 1B:
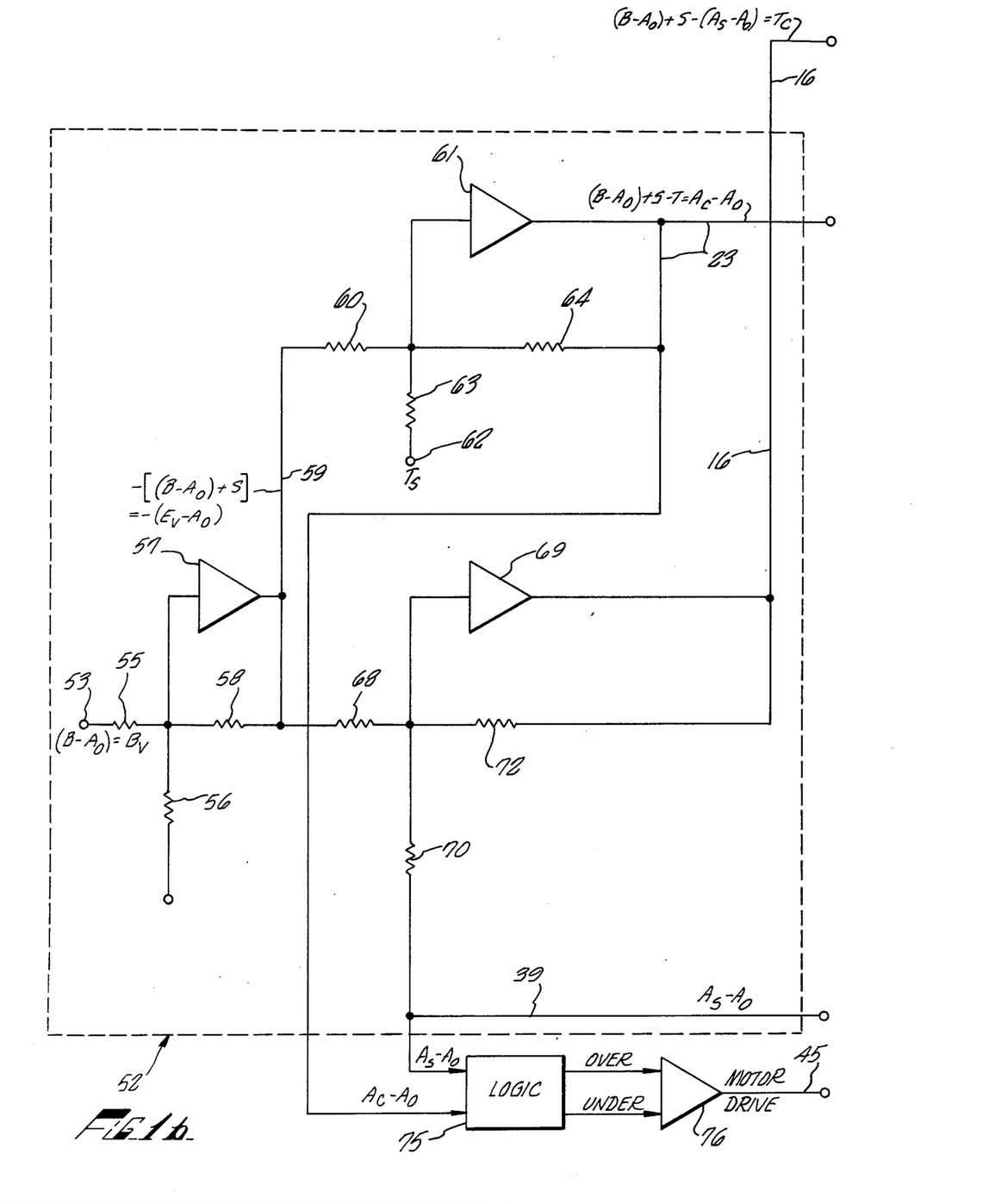

Turning now to the drawings and first to FIGS. 1A and 1B, FIG. 1A illustrates in exploded form components of the camera and the display system, and FIG. 1B diagramatically illustrates the portions of the calculation system of the camera for deriving the necessary electrical signals for the display system of FIG. 1A.

In FIG. 1A, a camera body is indicated at 10 and an interchangable objective lens is indicated at 11. The camera body 10 includes a viewfinder having a display screen 12 by means of which the scene to be photographed is viewed by the camera user, and aperture and shutter speed values are displayed to the user. A shutter speed scale 13 is shown at the right-hand side of the display and an associated meter 14 with a pointer 15 provides an indication of shutter speed as controlled by a signal on an input line 16. As illustrated, the shutter speed to be indicated is calculated shutter speed $T_c$, although a set shutter speed $T_s$ can be displayed if desired. Alternatively, the meter or galvanometer 14 may be replaced by a series of light sources to illuminate one or more indicia on the scale 13 in the manner described in the above-referenced application.

The left side of the display includes a movable aperture scale 20 associated with a meter 21 having a pointer 22 for indicating an aperture value. The meter 21 is responsive to a signal on an input line 23. This signal, as will be explained in more detail later, is a relative aperture value, namely a mathematical combination of calculated aperture $A_c$ and an open (or minimum, such as f 2.8) aperture value $A_o$. As will be described in greater detail subsequently, the scale 20 is mechanically moved, as a function of the open aperture value $A_o$ of the lens 11 being used, to enable a display of an absolute aperture value ($A_c$ as shown, but the display can indicate set aperture $A_s$). Mathematically, the electrical-mechanical summation is $(A-A_o)+A_o=A$, where A is $A_c$ or $A_s$ and $A_o$ is the open aperture value of the lens 11 being used. As with the shutter speed meter 14, the aperture meter 21 can alternatively comprise a series of light sources for indicating the aperture value or values. Furthermore, the camera display includes over, under and okay warning lamps 25, 26 and 27.

The camera body 10 has coupled thereto for rotation first and second control rings 30 and 30. The ring 31, which may be termed an $A_o$ ring, includes a finger 32 which couples with a fixed index on the lens 11 being used and which sets the open aperture value corresponding to the lens being used. A mechanical linkage 33 couples the ring 30 with the aperture display scale 20. Then the lens 11 is attached to the camera body, the ring 30 is rotated to a position indicative of the open aperture value of the lens 11 being used, and thereby moves the aperture display scale 20 in a manner which effectively enters the open aperture value $A_o$ into the display system. As shown, the lens 11 has an open aperture value f 2.8. If an f 2.0 lens 11 were used, the display scale 20 would be pushed upwardly one aperture value from that seen in FIG. 1A. Accordingly, it will be seen that the ring 30 is rotated to a position upon attachment of the lens 11 to the camera body 10 to set the position of the display scale 20 to effectively mechanically add $A_o$ to $(A_c - A_o)$ to enable the display of an absolute aperture value (eg., $A_c$, or $A_s$ as the case may be). This is achieved by a direct mechanical coupling between an encoded pin (not shown) of a lens 11 and the scale 20, and the first position (eg., F 2.8 as shown in FIG. 1A) corresponds to the open aperture value $A_o$ of the lens. Not only is the electro-mechanical summation performed in this simple manner, but also the camera user can readily see in the viewfinder the open aperture value of the lens 11 being used.

The second ring 31, which may be termed an $(A_s - A_o)$ ring, likewise is mounted on the camera body 10 for rotation. This ring 31 includes a finger 35 which is coupled with the diaphragm lever of the lens 11 to set the lens diaphragm at the appropriate value when taking a photograph. An aperture potentiometer 37 also is mounted on the camera body 10 in a fixed position, and a wiper 38 of the potentiometer 37 is moved in response to rotation of the ring 31 to provide a relative aperture value signal (set aperture $A_s$ minus open aperture value $A_o$) on an output line 39. The ring 31 may be rotated manually in response to rotation of the usual diaphragm ring on the lens 11 or may be rotated by a diaphragm ring or knob on the camera body. In an automatic camera system, the ring 31 is rotated by a servo motor 42 via shaft 43 and worm gear 44 in response to signals on line 45. For example, when an automatic camera is set in the shutter preferred mode, the selected shutter speed is set by the user and the aperture value is calculated by the camera electronic system and set by the motor 42 which appropriately rotates the ring 31 which, in turn, sets the proper diaphragm opening of the lens 11. The motor 42 may be pivotally mounted as indicated at 46-47 to enable the gear 44 to be disengaged from the ring 31 when the camera is in a manual mode, and to enable the gearing to engage when in the automatic mode. All of the elements of FIG. 1A except the lens 11 are part of or contained in the camera body 10.

From the foregoing, it should be apparent that the display system of the present invention involves the use of a relative aperture value signal $(A - A_o$, wherein A may be $A_c$ or $A_s$) is combined with a fixed aperture value (eg., $A_o$) characteristic of the lens 11 being used in an electro-mechanical fashion to provide an indication of an absolute aperture value ($A_c$ or $A_s$) and to indicate to the camera operator via the viewfinder the fixed value ($A_o$) of the lens being used.

While the foregoing describes an exemplary embodiment of the electro-mechanical summation to provide a display of the absolute aperture value, an exemplary embodiment of an electronic system for the camera for deriving the various signals is described below. Turning first to FIG. 1B, the same illustrates a portion of the camera electronic system in diagramatic form for deriving the necessary electrical signals, the details of which are more fully shown in FIGS. 2 through 4. A portion of a log converter and calculator 52 is shown in FIG. 1A, and comprises an input 53 for receiving a brightness value signal $(B - A_o) = B_v$, and an input 54 for receiving a film sensitivity signal S. These signals are applied through respective summing resistors 55 and 56 to an amplifier 57 having a feedback resistor 58. The output of the amplifier 57 on line 59 is a signal $-[(B - A_o) + S]$. This signal is applied through a summing resistor 60 to the input of an amplifier 61, and is summed with a selected shutter speed signal $T_s$ applied to input 62 and through summing resistor 63 to the amplifier 61. The amplifier 61 has a feedback resistor 64, and its output on line 23 is a signal $(B - A_o) + S - T = (A_c - A_o)$. The output of the amplifier 57 also is applied via the line 59 and a summing resistor 68 to the input of an amplifier 69. This amplifier also receives via summing resistor 70 and line 39 the feedback signal $(A_s - A_o)$ from the potentiometer 37 and wiper 38 of FIG. 1A. The amplifier 69 has a feedback resistor 72, and its output on line 16 is a signal $(B - A_o) + S - (A_s - A_o) = T_c$. The signals on the line 23 $(A_c - A_o)$ and line 39 $(A_s - A_o)$ are applied to a logic circuit 75 which provides "over" and "under" signals to a motor drive amplifier 76. The motor drive amplifier 76 has an output line 45 (representing a pair of lines to cause the motor 42 of FIG. 1A to move in a forward and in a reverse direction) to control the rotation of the servo motor 42 in positioning the ring 31 of FIG. 1A. With the present system it is not necessary to electrically enter an open aperture $A_o$ signal inasmuch as the same is entered mechanically by the ring 30 of FIG. 1A as explained earlier.

ELECTRONIC SYSTEM

Figure 2:
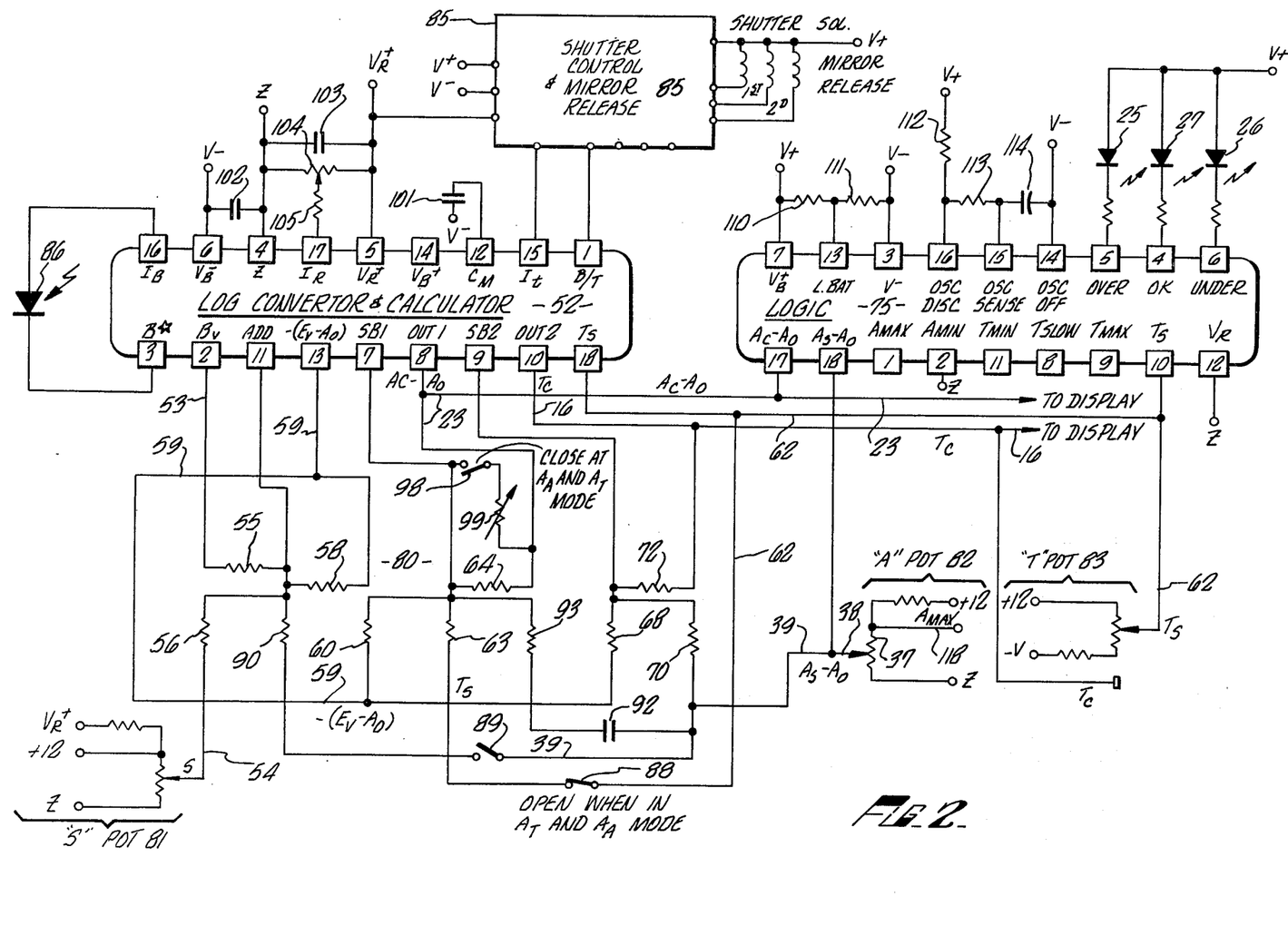
FIG. 2 is a block diagram of an exemplary electronic system for the camera.
Figure 3:
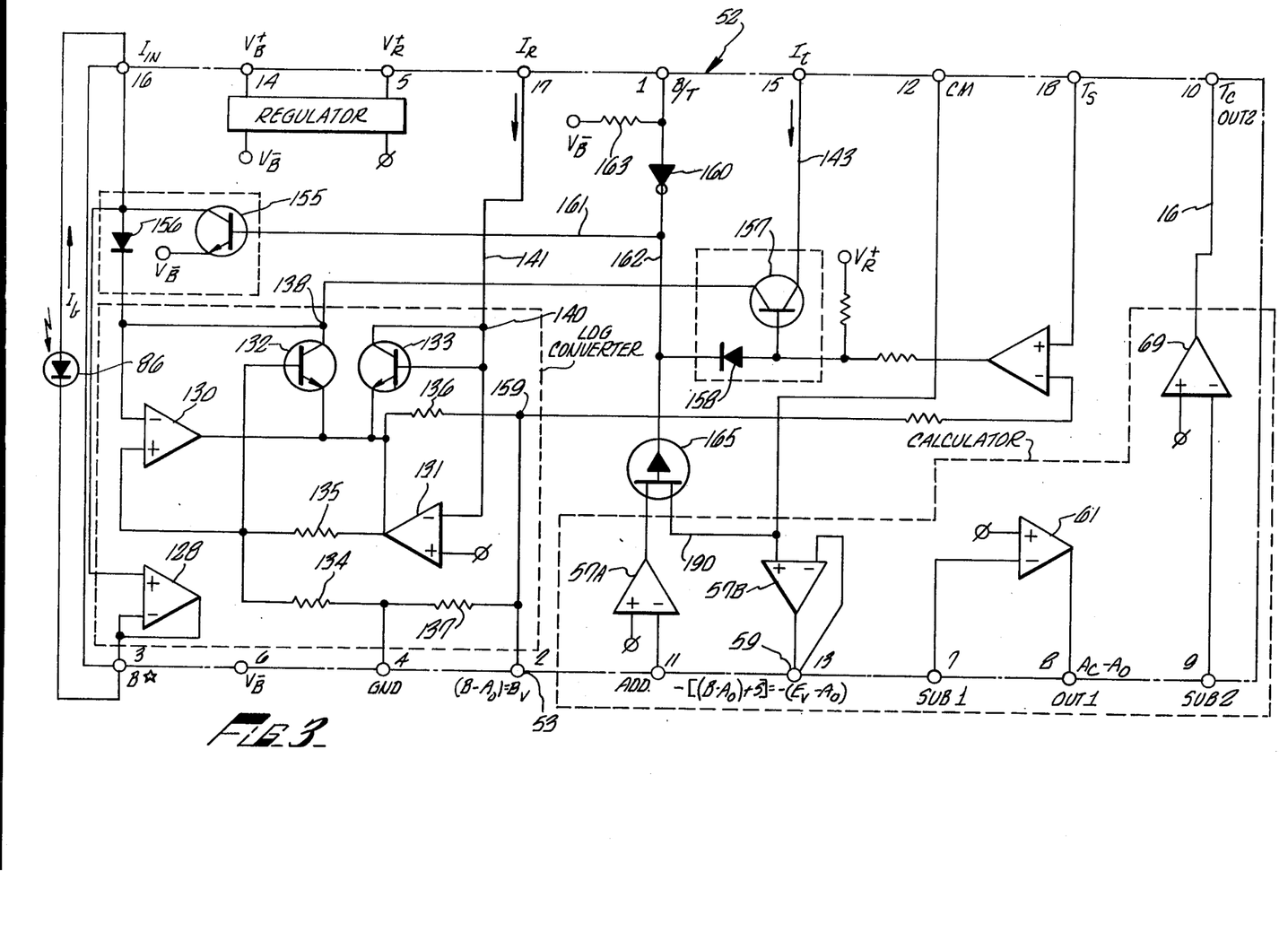
FIG. 3 is a diagram of a log converter and calculator of the system of FIG. 2.
Figure 4:
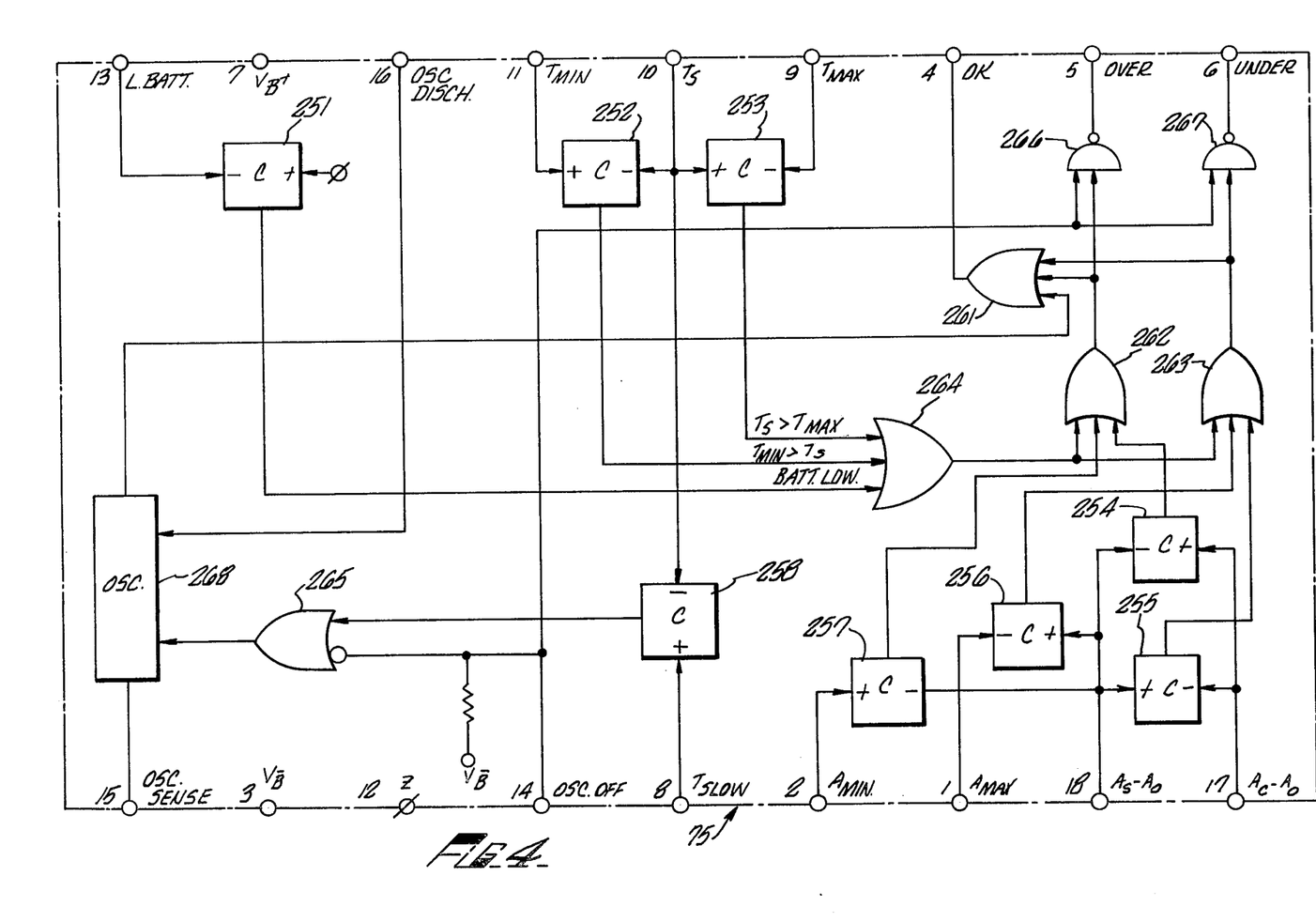
FIG. 4 is a diagram of the logic circuit of FIG. 2.

FIGS. 2, 3, and 4 herein are included for the sake of completeness, but are substantially identical to FIGS. 2, 3 and 4 of said above-referenced application, and reference may be made thereto for a more comprehensive description of the various features of the electronic system for the camera. FIG. 2 shows an exemplary electronic system for receiving the various input parameters, computing aperture and shutter time values, controlling the shutter and aperture diaphragm, and displaying aperture and shutter time values. The inputs include, for example, brightness as measured through the objective lens 11, film sensitivity, and aperture and shutter time values. This system includes a log converter and calculator 52, an input resistive network 80, film sensitivity "S" potentiometer 81, aperture "A" potentiometer 82, shutter speed "T" potentiometer 83, logic circuit 75, and shutter control and mirror release circuit 85.

A photodiode light sensor 86 is connected with the log converter and calculator 52 to provide a brightness value signal. The calculator includes the active components of FIG. 1B and the network 80 includes the resistors of FIG. 1B. This signal may be designated $(B^* - A_o)$ since it represents the brightness $(B^*)$ of light received through the open aperture $(A_o)$ of the lens. As the signal is processed it is temperature compensated in the log converter and then is designated $(B - A_o)$. In addition to the brightness value signal, the electronic system, comprising the converter and calculator 52 and logic 75, receive inputs of film sensitivity S, selected shutter speed $T_s$ and a relative aperture value $A_c - A_o$, and the calculator 52 in turn calculates both shutter speed $T_c$ and a relative aperture value $A_c - A_o$, either or both of which may be used in automatically controlling the shutter and/or aperture diaphragm as will be apparent to those skilled in the art. The calculator circuit 52 additionally memorizes an exposure value signal ($E_v - A_o$) without fixing or freezing either the shutter speed value or the aperture diaphragm value, thereby allowing the camera user to still vary either one while automatically and electronically appropriately changing the other after the exposure value is memorized. This is more fully explained, as are the features thereof, in said above-referenced application. The log converter and calculator 52 uses a logrithmic circuit to provide a log function for converting the incident light signal to the brightness value log signal and for generating the antilog control signal for control of the shutter speed, again as more completely described in the prior application. The referenced numerals used in FIG. 2 are the same as those used in FIG. 1A for corresponding components. Terminals of the log converter and calculator 52 and the logic circuit 75 are numbered, and these numbers correspond with like terminals of the detailed diagrams for these circuits in respective FIGS. 3 and 4 which will be discussed later.

The brightness value signal $B_v$ is developed by the log converter and calculator 52 from the light impinging on the photodiode 86 as will become apparent in the discussion of FIG. 3. This signal appears on the terminal 53 of the circuit 52. The film sensitivity signal S is derived from the potentiometer 81 and is applied to summing resistor 56 of the resistor network 80. In a similar manner, the selected shutter speed $T_s$ is derived from the potentiometer 83 and applied by the line 62 through a switch 88 to the summing resistor 63 of the resistor network 80. The switch 88 is normally closed, but is open in the fully automatic mode. The relative aperture value signal ($A_s - A_o$) is derived from the potentiometer 82 and applied by line 39 to the summing resistor 70 of the resistor network 80. In a closed aperture metering mode of the system, this signal also is applied through switch 89 (otherwise normally open) to a summing resistor 90. A capacitor 92 and summing resistor 93 are connected between the line 39 and the junction of the summing resistors 63 and 64 to improve feedback stability of the servo motor 42 which controls the diaphragm aperture setting of the lens 11 of FIG. 1A.

A normally open switch 98 and variable resistor 99 are connected between terminal 7 and 8 of the log converter and calculator 52. The switch 98 and resistor 99 provide greater user-control of the camera system. The switch 98 is closed in the fully automatic mode, and the calculator 52 calculates both $T_c$ and $A_c$. The variable resistor 99 can be accessible to the user on the exterior of the camera body to allow the user to vary the relationship between the calculated values $T_c$ and $A_c$. This effectively enables a program change to be made which overrides the hardwired program of the calculator 52. The resistors 55, 56, 58, 60, 63, 64, 68, 70, 72, 90 and 93 preferably are equal (such as 100,000 ohms each) to preprogram a constant K into the system to cause $A_s = A_c = KEV$, with the value of K being a function of the value of certain resistors in the resistor network 80 and variable by the variable resistor 99 as more fully explained in the prior application.

Terminals 1 and 15 of the log converter and calculator 52 are connected to the shutter control and mirror release 85 to control the release of the first and second curtains of a focal plane shutter and to control release of the camera mirror in the exemplary embodiment shown in FIG. 2. As noted earlier, an exposure value signal is stored, and this signal is stored on a memory capacitor 101 connected with terminal 12 of the circuit 52. A capacitor 102 is connected between terminals 4 and 6, and a capacitor 103 is connected between terminals 4 and 5 as power supply noise filters. A potentiometer 104 is connected between terminals 4 and 5, and a resistor 105 is connected with the wiper of the potentiometer 104 and with terminal 17 to set a reference current $I_r$. The voltage terminals labeled V− and V+ are supplied with camera battery voltage under appropriate conditions, such as when the shutter release button is depressed. The terminals labeled Z indicate a reference or ground terminal.

The logic circuit 75 serves to provide signals to the display to indicate over, okay and under conditions, and to provide the over and under signals to the motor drive circuit 76 of FIG. 1B to cause the aperture motor 42 of FIG. 1A to set the aperture diaphragm of the lens 11 at the appropriate position. The logic circuit 75 receives various inputs as indicated in FIG. 2, and these inputs will be more fully described in a discussion of FIG. 4. A resistive divider 110-111 is connected with terminals 7, 13 and 3 of the logic circuit 75 to set the voltage at which a "low battery" signal is given. Resistors 112 and 113 and a capacitor 114 connected with terminals 14–16 of the logic circuit 75 determine the frequency and duty cycle of an oscillator within the logic circuit 75. The resistor 112 and capacitor 114 set the frequency, and the value of the resistor 113 sets the duty cycle.

The Amax. input on terminal 1 of the logic circuit 75 is derived from a terminal 118 of the aperture potentiometer 82. The Amin. input on terminal 2 is connected to ground and is zero voltage. This is the $A_o$ value and can be zero or another reference value because of the use of relative aperture values in the present system. The Tmin., Tslow, and Tmax. inputs to respective terminals 11, 8 and 9 of the logic circuit 75 can be supplied in any suitable manner, such as from contacts on the shutter speed selector dial or knob, or in any other suitable manner. Amax. is a fixed voltage level indicating the maximum aperture value of the lens, such as f 22. The Tmin. input at terminal 11 is a voltage which represents the slowest shutter time, such as one second. Tmax. at input terminal 9 is a voltage level representing the fastest shutter speed, such as 1/1000th of a second. Thus, Tmin. and Tmax. are fixed voltage levels depending upon the speed characteristics of the shutter used in the camera. The Tslow input at terminal 8 likewise is a fixed voltage level, and is used to represent the typical slowest shutter speed, such as 1/30th of a second, to be used in a hand-held operation (without a tripod). The Amin. input on terminal 2 represents $A_o$ and can be zero or any other suitable fixed reference voltage level inasmuch as relative aperture values (eg. $A_s - A_o$) are used in the present calculation system.

Turning now to FIG. 3, the same illustrates a circuit, which can be in integrated circuit form, for the log converter and calculator 52. Again, like reference numerals are used to designate like components of FIG. 1A and FIG. 2. It is to be understood that a suitable dc voltage source (not shown), such as the camera battery, provides the necessary power for the overall system, and more details thereof are set forth in said prior application. The light sensor 86 is connected between terminals 3 and 16 of the circuit 52 shown in FIG. 3. An amplifier 128 is connected between these terminals to supply a suitable low voltage across the photodiode light sensor 86 to thereby reduce the leakage of the photodiode.

The log converter portion of the circuit 52 includes amplifiers 130 and 131, transistors 132 and 133, and associated resistors 134 through 137. A junction 138 at the collector of transistor 132 is the $I_b$ input to the log converter, and junction 139 (between resistors 136–137 and connected to pin number 2) is the $B_v$ output of the log converter. A junction 140 at the collector of the second transistor 133 is a reference current $I_r$ input to the log converter and is connected by a line 141 with the potentiometer 104 of FIG. 2. The potentiometer 104 allows the reference current $I_r$ to be adjusted for calibration of the system. It adjusts the magnitude of current through the second transistor 133 to a desired value. For example, it can be adjusted to cause $I_b$ to equal $I_r$ so as to provide an output of zero volts at the output junction 139 of the log converter. Alternatively and preferably, it can be calibrated to calibrate the shutter timer of the shutter control 85 during the shutter control phase of operation (as distinguished from the preceding light metering phase of operation) to cause the shutter control current $I_t$ on a line 143 (pin number 15) to equal $I_r$ to obtain a zero volt output at output junction 139 (also pin number 2) of the log converter.

The calculator portion of the circuit 52 of FIG. 3 includes the amplifier 57A–57B having two stages as shown, and the amplifiers 61 and 69 described earlier in the discussion of FIG. 1B. The calculator also includes the various resistors previously described in connection with the description of FIG. 2.

The circuit of FIG. 3 includes a first switch comprising a transistor 155 and a diode 156, and this switch functions to apply the photodiode current $I_b$ to the log converter. This current $I_b$ flows through the first transistor 132 of the log converter. A second switch comprising a transsistor 157 and a diode 158 is provided, and passes the shutter timer current $I_t$ through the first transistor 132 of the log converter and controls the magnitude of $I_t$ all as more fully described in the prior application. These two switches are controlled from the shutter control and mirror release 85 which is connected from the $+V_r$ reference voltage line 78 to the input of a logic inverter amplifier 160. The output of the amplifier 160 is connected by a line 161 to the base of the transistor 155, and by a line 162 to the cathode of the diode 158. A pull-down resistor 163 for the input of the amplifier 160 is connected between the input of this amplifier and $-V_b$. When a switch in the control 85 is closed, $+V_r$ appears at the input of the inverting amplifier 160, and a similar but negative voltage appears at the output of this amplifier. When this switch is open, $-V_b$ is applied to the input of the amplifier 160 and a similar but positive voltage appears at the output thereof. The output voltages of the amplifier 160 control the states of these two switches, as well as the state of a field effect transistor switch 165 which forms, in conjunction with the memory capacitor 101 (FIG. 2), a sample and hold circuit for holding the relative exposure value $-(EV-A_o)$ when this switch in control 85 is open.

In the operation of the circuit of FIG. 3, a main switch (not shown) connected with the dc power source of the camera typically is closed upon partial depression of the shutter release button of the camera to apply power to the system. The switch of the control 85 connected to terminal 1 (B/T) is closed at this time, and the output of the inverting amplifier 160 applies a negative voltage to the base of the transistor 155. This turns off the transistor 155 thereby allowing the current $I_b$ from the light sensor 86 to flow through the diode 156 and into the collector-emitter path of the first transistor 132 of the log converter. At this time, with the negative output from the inverting amplifier 160, the transistor 157 is off and the shutter timer current $I_t$ cannot flow to the transistor 132 of the log converter. Also at this time, the reference current $I_r$ flows through the line 141 and the collector-emitter path of the second transistor 133 of the log converter. The log converter provides an output voltage at junction 139 which is applied to pin number 2, and this voltage is equal to the log value of the current $I_b$ through the first transistor 132 divided by the reference current $I_r$ through the second transistor 133 (that is, the ratio of $I_b$ to $I_r$). The reference current $I_r$ is constant inasmuch as the same is set by the variable resistor 105 (FIG. 2).

Additionally, the above-described switch of control 85 is closed, the FET switch 165 is on (closed). The voltage $B_v$ is applied through resistor 55 of resistor network 80 (FIG. 2) to the minus input of amplifier 57A of the calculator portion of the circuit of FIG. 3. Also applied to this input of this amplifier 57A is the log value of S through resistor 56 of network 80. The closed resistance of the FET 165 is low and the output impedance of the amplifier 57A is low and therefore a power source is provided at the output of this amplifier for rapidly charging the memory capacitor 101. As can be seen from FIG. 3, the output of the amplifier 57A is connected through the closed FET 165 and line 170 to the terminal 12 and from there to the capacitor 101. This line is also connected to the plus input of the amplifier 57B which is a unity gain amplifier, with high input impedance to minimize leakage of the charge from capacitor 101. The output of amplifier 57B appears at pin number 13, and this output is a voltage $-(EV-A_o)=-[B^*-A_o)+S]$. The resistor 58 provides feedback from the output of amplifier 57B to the minus input of the amplifier 57A. The exposure value signal at terminal 13 is applied through a resistor 60 to the minus input of the amplifier 61 for calculation of $A_c$, and through the resistor 68 to the minus input of the amplifier 69 for calculation of $T_c$. When the switch of control 85 connected to terminal 1 (B/T) is opened, the FET 165 goes off so that the exposure value is stored and available at terminal 13 for continuing calculation of $A_c$ and $T_c$ in the event $A_s$ and/or $T_s$ are changed by the operator.

The relative selected aperture value $A_s-A_o$ (note FIG. 2) and terminal 7 is applied by line 39, capacitor 92, resistor 93, to the minus input of the amplifier 61. This input is for servo correction purposes and provides the first derivative of speed of iris diaphragm motor 42 (FIG. 1A). Another input, depending upon the position of switch 88 in FIG. 2, is applied through the resistor 63 and terminal 7 to the minus input of the amplifier 61. The output of the amplifier 61 is $(A_c-A_o)=(B^*-A_o)+S-T_s$ and is applied through terminal 8 to output line 23, and fed back through resistor 64 to the minus input of this amplifier.

In addition to the exposure value applied through terminal 9 to the minus input of the amplifier 69, the relative selected aperture value $A_s-A_o$ is applied through line 39 and resistor 70 to this input 9, as is the calculated shutter time $T_c$ through line 16 and resistor 72. The output of the amplifier 69 appears on output line 16 from pin number 10 of the circuit and is $T_c=(B^*-A_o)+S-(A_s-A_o)$.

From the description thus far, it should be apparent that the light through the objective lens received by the light sensor diode 86 results in a current $I_b$. With the switch of the control 85 this current is applied through the diode 156 and through the collector-emitter path of the first transistor 132 of the log converter. A reference current $I_r$ flows through the collector-emitter path of the second transistor 133 of the log converter, and the log converter provides an output at terminal 2 which is a voltage $B_v$ representing the ratio of $I_b$ to $I_r$. This is a log voltage $B_v$ and is applied to the calculator as an input to the amplifier 57A. The calculator also receives the log value of film sensitivity S (which can include a calibration factor C) and the memory capacitor 101 charges. The output of the amplifier 57B at terminal 13 is the relative exposure value $-(E_v-A_o)$, and this exposure value is memorized or stored when switch of control 85 opens (when the mirror flips up). From this relative exposure value, the calculated shutter time $T_c$ and the calculated relative aperture value $A_c-A_o$ are computed in the calculator in the manner described above. The foregoing explains the manner in which the incident light is metered, $B_v$ is developed and the relative exposure value $-(E_v-A_o)$ is stored or memorized thereby enabling automatic calculation of either or both of $T_c$ and $A_c$. Reference may be made to said prior application for a fuller discussion of the automatic and manual modes of operations, the other components of the calculator, and the various features of this exemplary calculation system.

FIG. 4 illustrates an exemplary circuit for the logic circuit 75. This circuit is more fully described in said prior application, and functions to provide signals to the motor drive amplifier 76 (FIG. 1B) for control of the servo motor 42 in positioning of the iris diaphragm of the objective lens 11 and positioning of the movable tap 38 of the potentiometer 37 in FIGS. 1A and 2. It also functions to provide suitable signals to the display 12 for providing a display of over, under and okay information, and can be used to control light sources, rather than meters, to display aperture and shutter speed data. It is a logic circuit containing eight voltage comparators 251 through 258, seven gates 261 through 265, and an oscillator 268. As will be explained below, the circuit of FIG. 4 provides two outputs from gates 266 and 267 to control the motor drive amplifier 76, and provides outputs from the gates 261, 266 and 267 to drive suitable indicators 25-27. If indicator lamps are used, the oscillator 268 is provided to cause an indicator to blink under certain conditions.

The logic circuit of FIG. 4 receives several variable inputs and several fixed inputs. The principal variable inputs are the calculated relative aperture value $A_c-A_o$ at input terminal 17, the relative selected aperture value $A_s-A_o$ at input terminal 18, and the selected shutter time $T_s$ at input terminal 10. The principal fixed inputs are the open aperture value $A_o$ (zero volts) at input terminal 2, Amax. at input terminal 1, Tslow at input terminal 8, Tmin. at input terminal 11, and Tmax. at input terminal 9. As previously explained, $A_c-A_o$ at input terminal 17 is the calculated relative aperture value. $A_s-A_o$ at input terminal 18 is the selected relative aperture value, and $T_s$ at input terminal 10 is the selected shutter speed. $A_o$ at input terminal 2 is the minimum aperture value (according to the Apex system) such as f2.8, and Amax. is the maximum aperture value, such as f22. $A_o$ is zero volts because of the use of the relative aperture values in the present system, and Amax. is a fixed voltage level depending upon the objective lens 11 being used. Tmin. at input terminal 11 is a voltage which represents the slowest shutter time, such as one second. Tmax. at input terminal 9 is a voltage level representing the fastest shutter speed, such as one thousandth of a second. Thus, Tmin. and Tmax. are fixed voltage levels depending upon the speed characteristics of the shutter used in the camera. Tslow at input terminal 8 is a fixed voltage level used to represent the typical slowest shutter speed, such as one thirtieth of a second, to be used in a hand-held operation (without a tripod). Other inputs include an oscillator off input terminal 14. A positive voltage level applied to this terminal turns off the oscillator 268. An example of a function of this input is to provide an indication that the shutter is open, in which case a negative is applied to terminal 14 to cause the oscillator to turn on and thereby cause a blinking indicating to occur. Frequency and duty cycle of the oscillator 268 are controlled by the signals applied to terminals 15 and 16 so as to provide external control over the nature of the blinking indicator. A terminal 13 provides a low battery voltage input to enable low battery voltage to be detected and indicated. Other inputs shown diagrammatically are the voltage source inputs, but their connections to the various components are not illustrated so as to minimize confusion in the understanding of the logic system of FIG. 4.

Output terminals 4, 5 and 6 may be used to drive suitable indicators (lamps 25-27, meters or the like). Output terminal 6 provides an indication that the film will be "under" exposed which occurs when $A_s$ is greater than $A_c$ (a minus output at terminal 6). Output terminal 5 provides an "over" exposure indication when $A_c$ is greater than $A_s$ (a minus output). Output terminal 4 provides an "okay" indication (minus) only if both the over and under indications are not present.

The comparator 251 receives the battery voltage input from terminal 13 and compares the same to reference ground. This comparator provides a positive output if the battery voltage is low. This positive output passes through the OR gate 264 and the OR gates 262-263 to the respective Nand gates 266-267 which, in turn, provide negative outputs to activate both the over and under indicators. When both of these indicators are activated, it signals that a limit or error condition exists (in this case, the battery voltage is too low). The comparator 252 receives the $T_s$ input from terminal 10 and the Tmin. from terminal 11 and provides a positive output when $T_s$ is smaller than Tmin. to indicate that the selected shutter speed is outside the range of the shutter. Similarly, $T_s$ and Tmax. are applied to comparator 253 which provides a positive output when $T_s$ is greater than Tmax., thereby indicating that $T_s$ is outside the range of the shutter. The comparator 258 also receives a $T_s$ input along with the Tslow input from terminal 8. This comparator provides a positive output if $T_s$ is smaller than Tslow to turn on the oscillator 268 through OR gate 265 to thereby provide a blinking indication for signaling to the operator that a tripod should be used. The output of the oscillator 268 is applied to the OR gate 261 to cause the okay source to blink under control of the oscillator.

The comparator 254 receives inputs $A_c-A_o$ and $A_s-A_o$ and provides a positive output when $A_c$ is greater than $A_s$. This output is applied through the OR gate 262 and inverted by Nand gate 266 to provide an over indication at output terminal 5. Similarly, comparator 255 receives $A_c - A_o$ and $A_s - A_o$ but provides a positive output when $A_s$ is greater than $A_c$ which, in turn, causes an uncer indication from output terminal 6. When $A_c$ is equal to $A_g$, the okay indication from terminal 4 occurs. In a similar manner, comparator 256 provides a positive output when $A_s$ is greater than Amax., and comparator 257 provides a positive output when $A_s$ is smaller than $A_o$ to provide suitable indications of these conditions.

While embodiments and applications of this invention have been shown and described, it will be apparent to those skilled in the art that modifications are possible without departing from the inventive concepts herein described.

What is claimed is:

1. A display system for a camera for displaying an aperture parameter comprising
    first means mechanically responsive to a fixed aperture parameter of a camera lens, and responsive to a variable aperture parameter of the lens and for providing an electrical signal representing a first relative aperture value,
    circuit means responsive to said first relative aperture value signal and at least another input photographic parameter, said circuit means developing therefrom a second relative aperture value, and
    display means including a movable scale, said display means being electically responsive to said second relative aperture value from said circuit means and mechanically responsive through said first means to said fixed aperture parameter of said lens.

2. A display system for a camera for displaying an aperture parameter comprising
    first means responsive to a fixed aperture parameter of a camera lens, and responsive to a variable aperture parameter of the lens and for providing an electrical signal representing a first relative aperture value, said first means comprising a first aperture ring responsive to the open aperture value of the camera lens and comprising a second ring responsive to a set relative aperture value of the lens,
    circuit means responsive to said first relative aperture value signal and at least another input photographic parameter, said circuit means developing therefrom a second relative aperture value, and
    display means including a movable scale, said display means being electrically responsive to said second relative aperture value from said circuit means and mechanically responsive to said open aperture value from said first means.

3. A system as in claim 2 wherein
    said first means includes variable voltage means responsive to the positioning of said second ring for providing said relative aperture value electrical signal from said first means,.

4. A system as in claim 2 wherein
    said circuit means comprises electro-mechanical drive means for varying the position of said second ring.

5. A display system for a camera for displaying an aperture parameter comprising
    first means responsive to a fixed aperture parameter and a variable aperture parameter of a camera lens, said first means comprising a first aperture ring responsive to the open aperture value of the lens and a second ring responsive to a set relative aperture value of the lens, said first means including variable electrical means responsive to the position of said second ring for providing an electrical signal representing the relative aperture value,
    circuit means responsive to said relative aperture value signal and responsive to input parameters of shutter speed and film sensitivity for developing a computed relative aperture value signal, and
    display means including a movable scale, said display means having means electrically responsive to said computed relative aperture value signal from said circuit means and including means mechanically interconnecting said first aperture ring and said movable scale for positioning said movable scale as a function of said fixed aperture value to thereby combine the computed relative aperture value signal with the fixed aperture value to cause the display of an absolute aperture value.

6. A display system for a camera for displaying an aperture parameter comprising
    first means responsive to a fixed aperture parameter and a variable aperture parameter of a camera lens, said first means comprising a first aperture ring responsive to the open aperture value $A_o$ of the lens and a second ring responsive to a set relative aperture value $A_s - A_o$ of the lens, said first means including variable electrical means responsive to the position of said second ring for providing an electrical signal representing the relative aperture value $A_s - A_o$,
    circuit means responsive to said relative aperture value signal and responsive to input parameters of shutter speed and film sensitivity for developing therefrom a computed relative aperture value signal $A_c - A_o$, and
    display means including a movable scale, said display means having means electrically responsive to said computed relative aperture value signal from said circuit means and including means mechanically interconnecting said first aperture ring and said movable scale for positioning said movable scale as a function of said open aperture value $A_o$ to thereby combine the computed relative aperture value signal $A_c - A_o$ with the open aperture value $A_o$ to cause the display of an absolute aperture value $A_c$.

7. A display system for a camera for displaying an aperture parameter comprising
    first means responsive to a fixed aperture parameter of a camera lens, and responsive to a variable aperture parameter of the lens and for providing an electrical signal representing a first relative aperture value, said first means comprising a first aperture means responsive to the open aperture value of the camera lens, second aperture means responsive to a set relative aperture value of the lens, and including variable electrical means responsive to the positioning of said second aperture means for providing said first relative aperture value electrical signal,
    circuit means responsive to said first relative aperture value signal and at least another input photographic parameter, said circuit means developing therefrom a second relative aperture value signal,
    electro-mechanical drive means coupled with said second aperture means and responsive to said circuit means for positioning said second aperture means, and
    display means including a movable scale, said display means being electrically responsive to said second relative aperture value from said circuit means and mechanically responsive to said fixed aperture parameter through said first means, said display means including mechanical linkage means interconnecting said first aperture means and said movable scale.

8. A display system for a camera for displaying an aperture parameter comprising first means responsive to a fixed aperture parameter of a camera lens, and responsive to a variable aperture parameter of the lens and for providing an electrical signal representing a set relative aperture value, said first means comprising first aperture means responsive to the open aperture value of the camera lens, comprising second aperture means responsive to a set relative value of the lens, and comprising variable electrical means responsive to the positioning of said second aperture means for providing said set relative aperture value electrical signal, circuit means responsive to said set relative aperture value electrical signal from said first means and at least another input photographic parameter, said circuit means developing therefrom a calculated relative aperture value, display means including a movable scale, said display means being electrically responsive to said calculated relative aperture value from said circuit means and mechanically responsive to said open aperture value from said first means, mechanical linkage means interconnecting said first aperture means of said first means and said movable scale, and electromechanical drive means coupled with said second aperture means of said first means, and responsive to said circuit means for positioning said second aperture means.

9. A display system for a camera for displaying an aperture parameter comprising first means responsive to a fixed aperture parameter of a camera lens, and responsive to a variable aperture parameter of the lens and for providing an electrical signal representing a set relative aperture value, circuit means responsive to said set relative aperture value signal and at least another input photographic parameter, said circuit means developing therefrom a computed relative aperture value, and display means including a movable operative scale for displaying the fixed aperture parameter of the lens, said display means providing an electromechanical summation by being electrically responsive to said computed relative aperture value from said circuit means and said scale being mechanically responsive to said fixed aperture parameter through said first means for displaying a selected aperture value which is the combination of the computed relative aperture value and the fixed aperture value.

* * * * *